(12) United States Patent
Hartman et al.

(10) Patent No.: US 11,320,077 B2
(45) Date of Patent: May 3, 2022

(54) SAFETY LOCK FOR CAM LOCK FITTING

(71) Applicants: Jeffrey Hartman, Mobile, AL (US); George L Williamson, Fairhope, AL (US)

(72) Inventors: Jeffrey Hartman, Mobile, AL (US); George L Williamson, Fairhope, AL (US)

( * ) Notice: Subject to any disclaimer, the term of this patent is extended or adjusted under 35 U.S.C. 154(b) by 0 days.

(21) Appl. No.: 16/841,785

(22) Filed: Apr. 7, 2020

(65) Prior Publication Data
US 2020/0232589 A1  Jul. 23, 2020

Related U.S. Application Data

(62) Division of application No. 15/416,002, filed on Jan. 26, 2017, now Pat. No. 10,655,769.

(51) Int. Cl.
F16L 37/18 (2006.01)

(52) U.S. Cl.
CPC .......... F16L 37/18 (2013.01); *F16L 2201/30* (2013.01); *Y10T 29/49826* (2015.01)

(58) Field of Classification Search
CPC .. F16L 37/18; F16L 2201/30; Y10T 29/49826
USPC ............................... 285/82, 85, 93, 311, 312
See application file for complete search history.

(56) References Cited

U.S. PATENT DOCUMENTS

| | | |
|---|---|---|
| 3,383,123 A | 5/1968 | Murray |
| 3,860,274 A | 1/1975 | Ledstrom et al. |
| 4,222,593 A | 9/1980 | Lauffenburger |
| 4,269,215 A | 5/1981 | Odar |
| 4,538,632 A | 9/1985 | Vogl |
| 5,234,017 A | 8/1993 | Aflin et al. |
| 5,338,069 A | 8/1994 | McCarthy |
| 5,595,217 A | 1/1997 | Gillen et al. |
| 5,863,079 A | 1/1999 | Donais et al. |
| 6,095,190 A | 8/2000 | Wilcox et al. |
| 7,147,004 B1 | 12/2006 | Hartman |
| 8,123,256 B1 | 2/2012 | Hartman |
| 8,632,103 B2 | 1/2014 | Fahie et al. |

*Primary Examiner* — Zachary T Dragicevich
(74) *Attorney, Agent, or Firm* — George L Williamson

(57) ABSTRACT

Method and apparatus for a safety lock assembly for a cam lock fitting mounted onto the outside of the cam lock fitting in close proximity to the cam levers to prevent complete separation of the male and the female portions of the fitting to prevent inadvertent pressurized discharge of dangerous materials. In one embodiment, this is accomplished by having slidable bosses upon which the cam levers are mounted which bosses are adapted to slide in response to movement of a safety handle so that the male and female portions of the cam lock fitting only slightly separate from each other allowing the operator to quickly reclose the cam lock fitting if the operator observes that the cam lock fitting still contains pressurized material. In a second embodiment, an earless cam disk moves on slotted, fixedly mounted bosses in response to movement of a safety handle similarly to the first embodiment.

10 Claims, 6 Drawing Sheets

SAFETY LOCK FOR CAM LOCK FITTING

RELATED APPLICATIONS

This application is a divisional application of U.S. patent application Ser. No. 15/416,002 filed Jan. 26, 2017 now patent Ser. No. 10/655,769.

BACKGROUND OF INVENTION

Field of the Invention

The present invention relates generally to cam lock fittings and, more particularly, is concerned with a safety lock for a cam lock fitting.

Description of the Prior Art

Cam lock fittings having safety features have been described in the related art. However, none of the related art devices disclose the unique features of the present invention. U.S. Pat. No. 6,095,190 to Wilcox, et al., dated Aug. 1, 2000, disclosed a coupling with a female half having internal pressure relief. U.S. Pat. No. 5,863,079 to Donais, et. al., dated Jan. 26, 1999, disclosed a quick-connect, disconnect coupling. U.S. Pat. No. 5,595,217 to Gillen, et al., dated Jan. 21, 1997, disclosed a dry break coupling assembly with a cam locking connection system, U.S. Pat. No. 5,234,017 to Aflin, et al., dated Aug. 10, 1993, disclosed a restrictor valve for metered liquid dispensing system. U.S. Pat. No. 4,538,632 to Vogl dated Sep. 3, 1985, disclosed a shut-off valve for a fuel truck or tanker drain off having down spouts. U.S. Pat. No. 4,269,215 to Odar dated May 26, 1981, disclosed a vapor flow control valve. U.S. Pat. No. 3,1860,274 to Ledstrom, et al., dated Jan. 14, 1975 disclosed a pipe coupling. U.S. Pat. No. 4,222,593 to Lauffenburger disclosed a fluid conveying coupling with safety locking device. U.S. Pat. No. 8,123,256 to Hartman dated Feb. 28, 2012 disclosed a safety lock for a cam lock fitting. U.S. Pat. No. 7,147,004 to Hartman dated Dec. 12, 2006 disclosed a check valve for a cam lock fitting. U.S. Pat. No. 3,383,123 to Murray dated May 14, 1968 disclosed a line pressure responsive safety coupling. U.S. Pat. No. 5,338,069 dated Aug. 16, 1994 to McCarthy disclosed a positively locking quick release coupling. U.S. Pat. No. 8,632,103 dated Jan. 21, 2014 to Fahie, et al. disclosed a lock for cam and groove coupler. While these devices related to cam lock fittings may be suitable for the purposes for which they were designed, they would not be as suitable for the purposes of the present invention, as hereinafter described. As will be shown by way of explanation and drawings, the present invention works in a novel manner and differently from the related art.

SUMMARY OF THE PRESENT INVENTION

The present mention discloses a safety lock assembly for a cam lock fitting mounted onto the outside of the cam lock fitting in close proximity to the cam levers so that when the cam lock fitting is pressurized unbeknown to the operator and the operator attempts to open the cam lock fitting the safety lock assembly will prevent operation or complete separation of the male and the female portions of the fitting to prevent inadvertent pressurized discharge of dangerous materials. In one embodiment, this is accomplished by having slidable bosses upon which the cam levers are mounted which bosses are adapted to slide in response to movement of a safety handle so that the male and female portions of the cam lock fitting only slightly separate from each other allowing the operator to quickly reclose the cam lock fitting if the operator observes that the cam lock fitting still contains pressurized material. In a second embodiment, an earless cam disk moves on slotted, fixedly mounted bosses in response to movement of a safety handle similarly to the first embodiment.

A major problem sought to be solved by the present invention is that which occurs when an operator of a conventional cam lock fitting undertakes the operation of opening a conventional cam lock fitting and the operator may not know if the contents of the conventional fitting are still under pressure, and if the contents are still under pressure the contents will spew out when the conventional fitting is opened possibly resulting in injury to the operator or an unwanted release of materials to the environment. The present invention resolves this problem by allowing the improved cam lock fitting to be only partially opened by means of a safety lock assembly which allows the improved fitting to be reclosed if the operator observes that the contents inside the improved fitting remain pressurized.

An object of the present invention is to provide a safety lock on a cam lock fitting so as to prevent overflows of fluid when the cam lock fitting is opened. A further object of the present invention is to provide a safety lock on the female end of a cam lock fitting. A further object of the present invention is to provide a safety lock which can be easily operated by a user as a part of the normal operation of a cam lock fitting. A further object of the present invention is to provide a safety lock which will be locked when the cam lock fitting is pressurized. A further object of the present invention is to provide a safety lock on a cam lock fitting which will prevent inadvertent pressurized discharges of environmentally damaging material from a hose connected to the cam lock fitting. A further object of the present invention is to provide a safety lock on a cam lock fitting which can be relatively inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
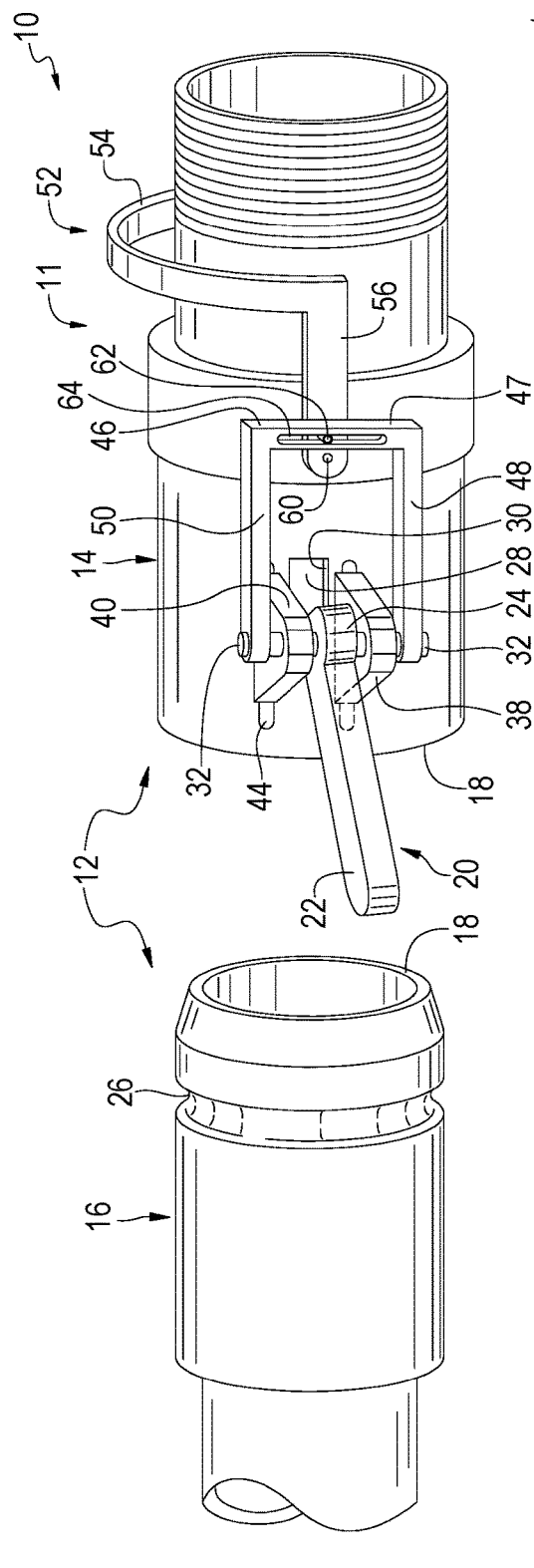
FIG. 1 is perspective view of a first embodiment of the present invention.

With regard to reference numerals used, the following numbering is used throughout the drawings.
10 present invention
11 first embodiment
12 cam lock fitting
13 second embodiment
14 female end portion
16 male end portion
18 front end
19 rear end
20 cam lever/ear
22 lever portion
24 cam portion
groove
28 opening
30 wall of cam lock fitting
32 axle
34 internal flange
36 O-ring
38 boss
40 boss
42 center line
44 slot
46 bracket
47 base portion
48 arm portion
50 arm portion
52 safety lock assembly
54 safety handle portion
56 arm portion
58 arm portion
60 pivot
62 pin/roller
64 slot
66 first position of safety lock assembly
67 intermediate position of safety lock assembly
68 second position of safety lock assembly
70 inside of female end portion
72 mounting members of boss
74 space
76 direction arrow
78 material
80 cam disk
82 safety latch
84 head/catch
85 head/catch
86 rivet
88 arcuate slot
90 aperture
92 offset

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims. FIGS. 1-13 illustrate the present invention wherein a safety lock for a cam lock fitting is disclosed.

Figure 2:
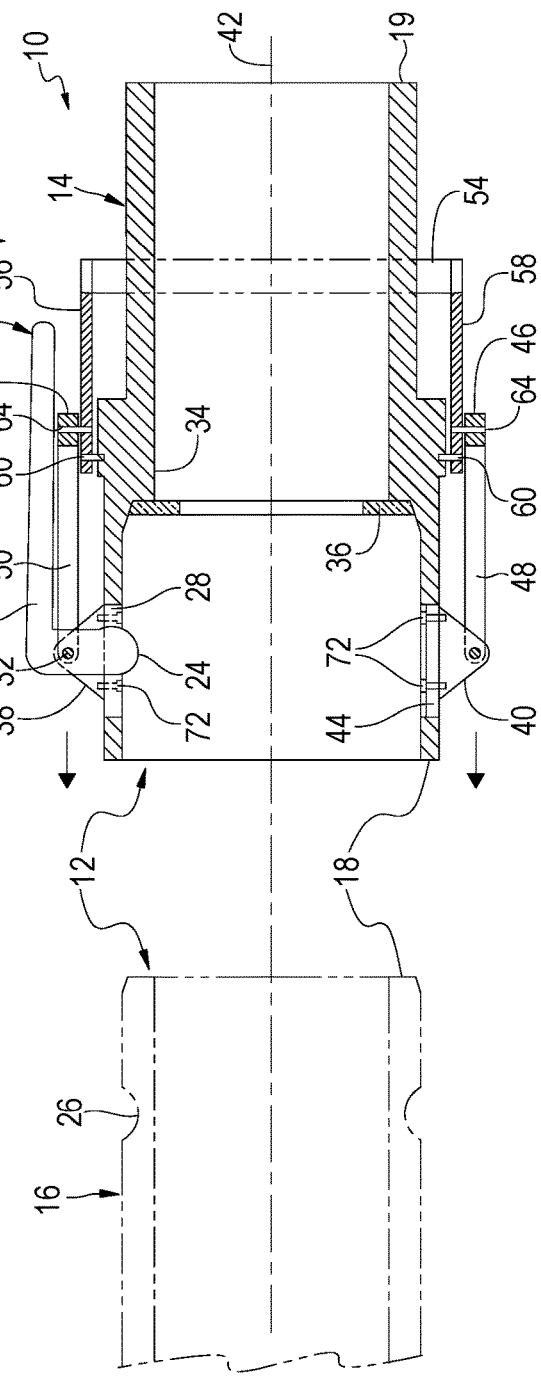
FIG. 2 is a cross section view of a first embodiment of the present invention.

Turning to FIGS. 1 and 2, therein is shown the present invention 10 showing a first embodiment 11 of a cam lock fitting 12 having a female end coupling portion 14 and a male end coupling portion 16 each having an end 18 which when joined together form a conduit. The female portion 14 has a pair of cam members, levers or ears 20, each having a lever portion 22 and a cam portion 24 thereon, which cam portion locks the female end 14 to the male end 16 by seating the cant portion 24 of the female portion within a groove 26 of the male portion as the two portions are joined. The cam portion 24 projects through an opening 28 in the wall 30 near the end 18 of the female portion 14 as the ears 20 pivot on axles 32. Also shown on the inside of the female portion 14 is an annular flange 34 cooperating with an O-ring seal or gasket 36 therein wherein the flange and O-ring extend entirely around the internal periphery of the female portion for making sealing contact with the end 18 of the male end portion 16 in a conventional manner when the male and female conduits 16, 14 are connected to each other. The ears 20 are each mounted onto an axle 32 extending through a left and right boss 38,40 on opposite sides of female coupling 14 and as taught by the present invention 10 the bosses are mounted to as to be slidably movable to the front 18 (a forward position) or rear end 19 (a rearward position) of the female coupling 14 parallel to the centerline 42 of the female coupling by each boss being mounted through a slot 44 extending through the wall 30 of the female coupling.

Figure 3:
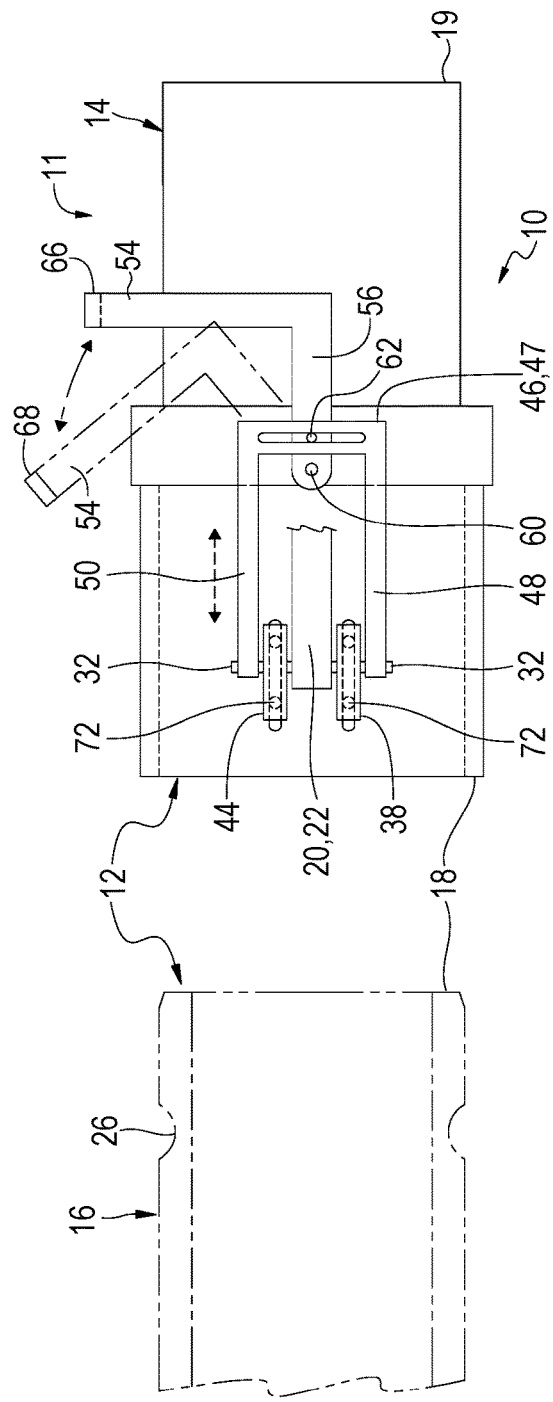
FIG. 3 is a side view of a first embodiment of the present invention.

Also shown is a U-shaped bracket 46 having a base portion 47 and a pair of oppositely disposed arm portions 48, 50 wherein each arm portion is connected to an end of the axle 32 which axle passes through bosses 38, 40. Also shown is a safety lock assembly generally indicated at 52 having a U-shaped safety lock handle portion 54 and a safety lock arm portion 56, 58 disposed on opposite sides of the female coupling 14 wherein each arm portion is mounted on a pivot 60 mounted onto an external surface of the wall 30 of the female portion 14 so that the handle portion 54 can be moved or partially rotated from a first position to a second position as shown in FIG. 3. Each arm portion 56, 58 has a pin/roller 62 mounted thereon which cooperates with a slot 64 in the base 47 of bracket 46 so that when the handle portion 54 is in a first downward dosed position the bracket 46 is moved to a first rear position away from end 18 and when the handle portion 54 is moved to a second upward open position the bracket 46 moves to a second forward position toward end 18.

In order for an operator to open a cam lock fitting 12 designed according to the teachings of the present invention 10, the operator must first move the safety handle 54 from the first downward closed position to the second upward open position so that the bosses 38-40 are moved from a rearward position away from end 18 to a forward position toward end 18 so as to relieve internal pressure contained inside the cam lock fitting so that when there is no pressure remaining in the cam lock fitting 12 the operator can continue with the next step of opening the fitting in the conventional manner by releasing the ears 20 and separating the male 16 and female 14 conduit portions as shown in FIG. 1. If there is still pressure inside the cam lock fitting 12 when the safety lock handle 54 is opened, the operator will immediately reclose the safety lock handle so as to pull the bosses 38-40 back into the locked position so as to reclose and reseal the cam lock fitting. Also shown are mounting members 72.

Turning to FIG. 3, therein is shown the present invention 10 showing the handle portion 54 of the safety lock assembly 52 in a first downward closed position shown at 66 and then in a second upward open position shown at 68 in order to illustrate the movement of the handle portion 54 of the safety lock assembly 52. The bosses 38, 40 are adapted to slide or move in response to movement of the handle portion 54 by having a bracket 46 connected to the axles 32 passing through the bosses and the cam lever 20 so that the bosses slide toward and away from end 18 in response to movement of the handle portion 54. Previously disclosed elements may also be shown.

Figure 4:
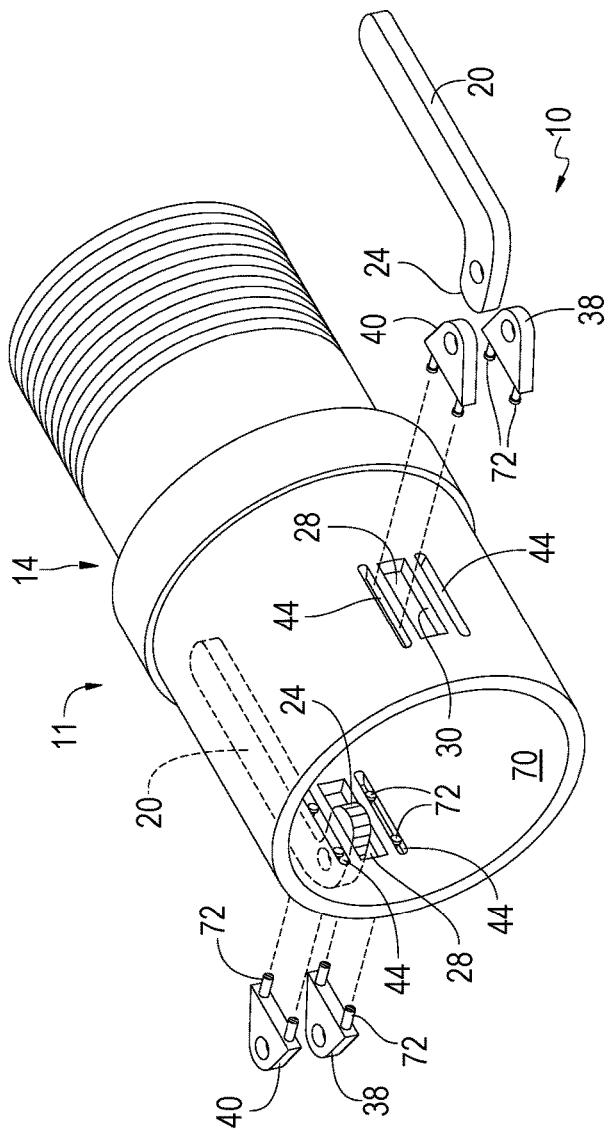
FIG. 4 is a perspective view showing the inside of a female coupling of a first embodiment of the present invention with certain parts being exploded away for illustration.

Turning to FIG. 4, therein is shown the inside 70 of the female coupling 14 along with the cam levers 20 on opposing sides of the female end portion 14 showing the bosses 38, 40 on each side of the female coupling and having a first opening or slot 28 through which the cam portion 24 of the levers pass through the wall 30 of the female end portion 14 along with a pair of slots 44 on each side of the opening 28 which pair of slots 44 are for the mounting members 72, e.g., rivets, screws, brads, studs or the like, which allow a lower base end of the bosses to be mounted into the slots 44 so that the bosses are slidable within these slots 44. As previously stated, the bosses 38, 40 are connected to a bracket 46 (not shown, see FIG. 1) so that the bosses slide in the slot in response to movement of the handle 54 (not shown, see FIG. 1). It is important that mounting members 72 not protrude into the interior 70 so as to interfere with movement of the male conduit 16 into or out of female conduit 14 so the members 72 are therefore inset into slots 44 which slots are designed to capture enlargements, or the like, of the tips of members 72 within the slots 44. Previously disclosed elements may also be shown.

Figure 5:
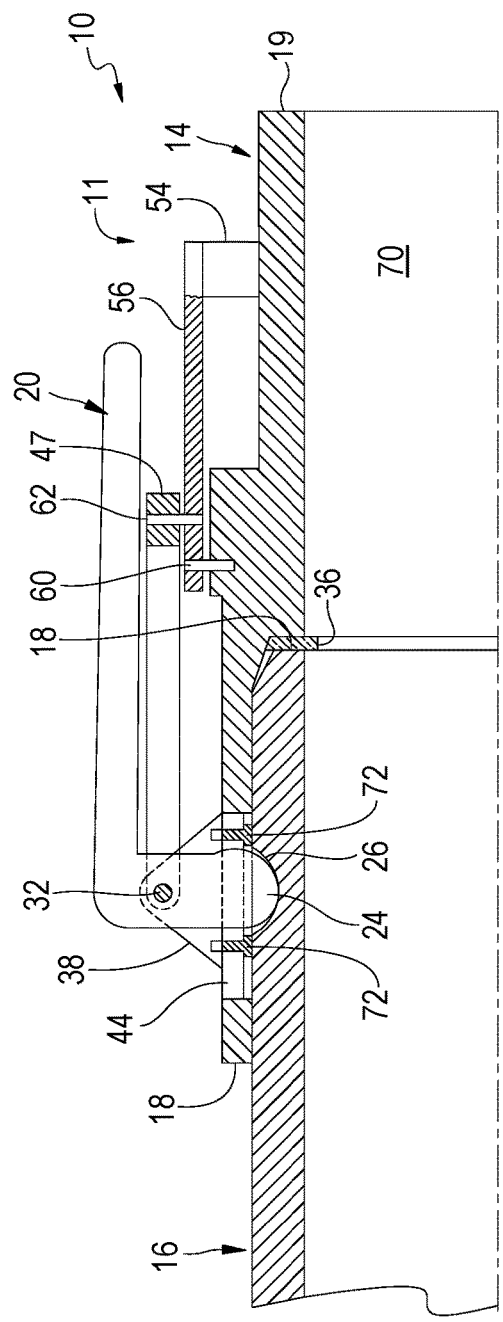
FIGS. 5 and 6 are cross sectional views of portions of a first embodiment of the present invention.
Figure 6:
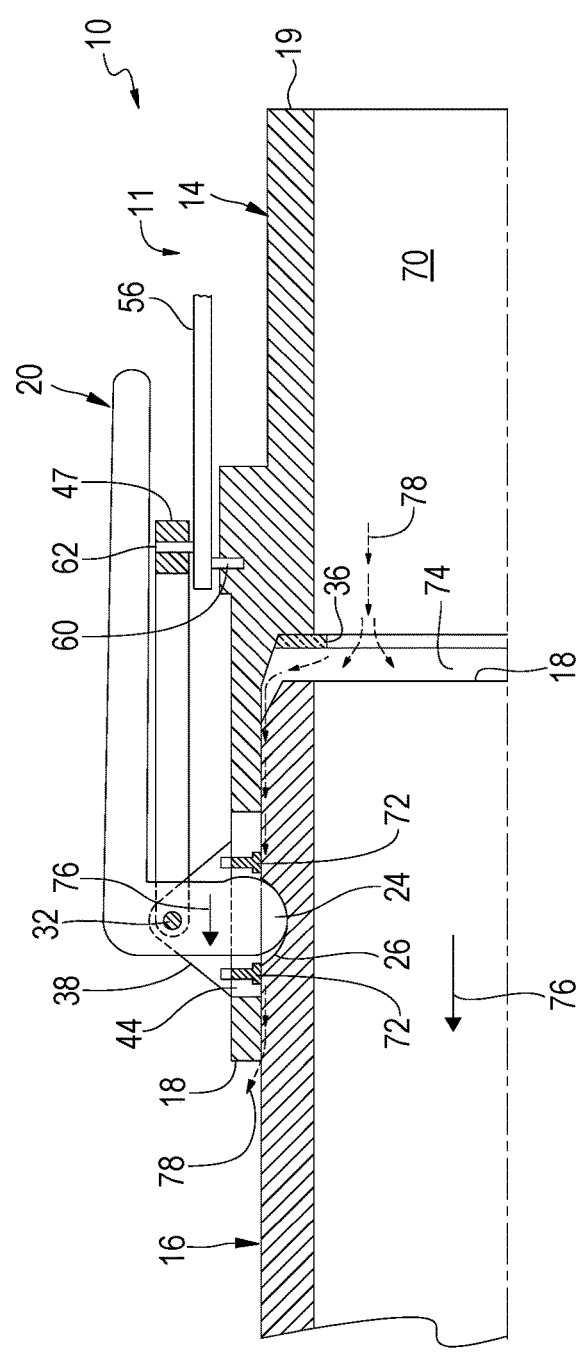

Turning to FIGS. 5-6, therein is shown the movement of the male conduit portion 16 relative to the female conduit 14 in response to movement of the safety handle 54 as previously disclosed. FIG. 5 shows the male end portion 16 mated tightly to the female portion 14 as would be the condition when the cam lock fitting 12 is in a sealing position and the safety handle 54 was in a first downward closed position so that the end 18 of the male end portion 16 is tightly sealed against the O-ring 36 of the female end portion 14. It can be seen in FIG. 5 that the bosses 38, 40 are positioned in the slot 44 so as to be disposed away from end 18 and toward the rear end 19 (a rearward position) of the female end portion 14 of the cam lock fitting 12. In contrast, FIG. 6 shows the male end portion 16 with a space 74 in between its end 18 and the O-ring 36 which would occur when the handle 54 was in a second upward open position which would allow the bosses 38, 40 to slide toward the male end portion 16 (a forward position) thereby allowing the release of pressure or material 78 from the inside of the female portion 14 of the cam lock fitting 12 as indicated by arrows 78. Movement of the male portion 16 is indicated by arrow 76. Previously disclosed elements may also be shown.

By way of additional general explanation, and by making reference to FIGS. 1-6, embodiment 11 of the present invention 10 discloses a safety lock mechanism 52 mounted on an outside surface of female coupling 14 proximate the cam member or lever 20 wherein the safety lock mechanism has a handle 54 which moves a bracket 46 connected to bosses 38, 40 so that when fluid in the cam lock fitting 12 is pressurized the handle remains in a first position 66 so as to seal and lock the cam lock fitting 12. In order to open the cam lock fitting 12, an operator must first move the handle 54 from the closed position 66 to open position 68 so as to allow the male coupling 16 end 18 to move slightly away from the O-ring 36 of female coupling 14 thereby creating a small space 74 to allow the operator to determine by visual or auditory observation, e.g., hissing, whether the cam lock fitting is pressurized or unpressurized. If the cam lock fitting 12 remains pressurized, the operator can quickly and easily reclose the cam lock fitting 12 by reclosing the safety handle 54. If the cam lock fitting 12 is unpressurized, the operator can then proceed to open the cam lock fitting in the conventional manner. It should be clear that the present invention 10 teaches that an additional step is required to open or close a cam lock fitting constructed according to the teachings of the present invention 10, and, the additional step involves opening or closing safety handle 54 as taught therein.

Figure 7:
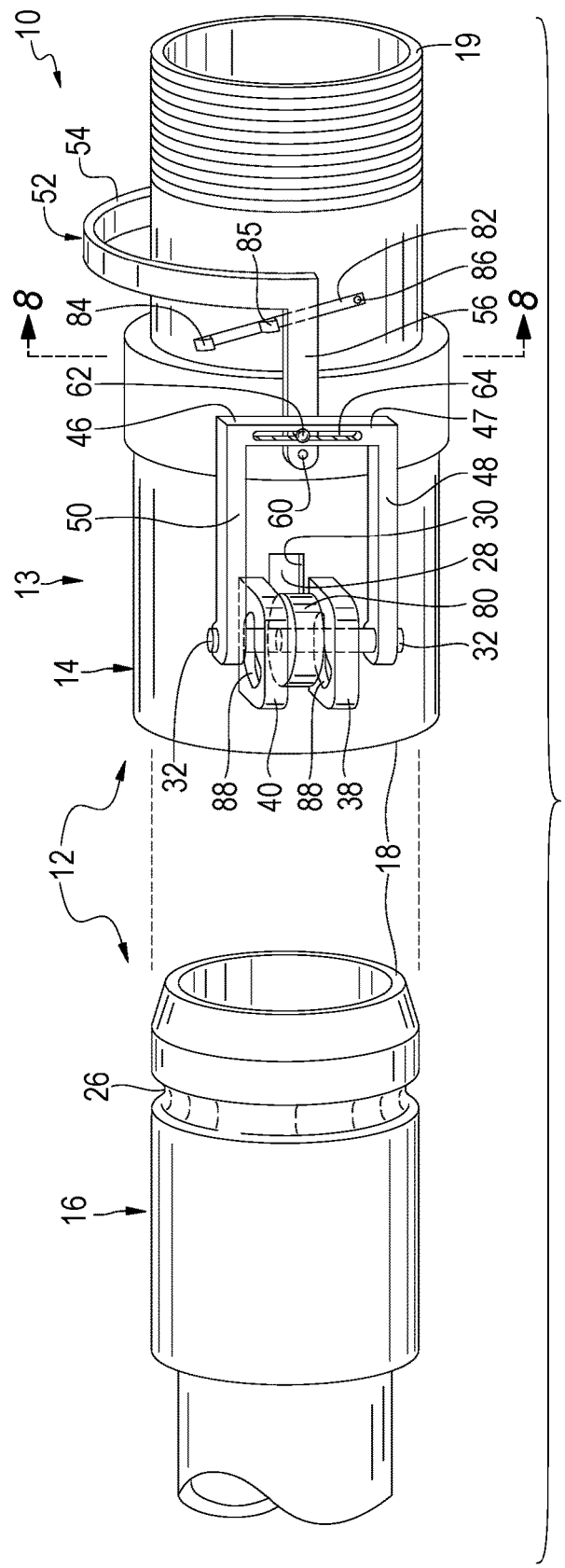
FIG. 7 is perspective view of a second embodiment of the present invention.
Figure 8:
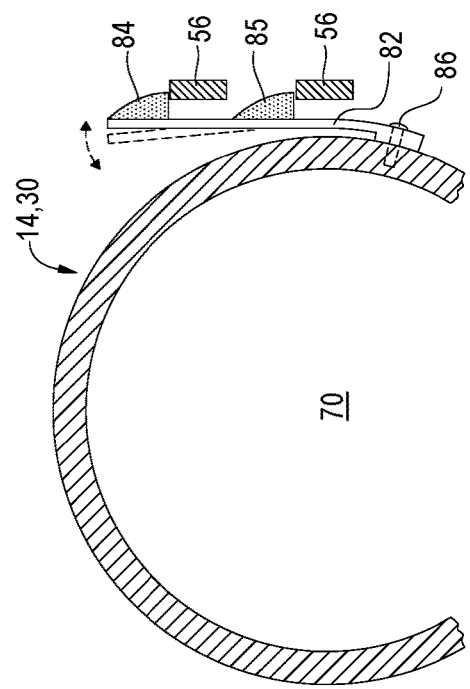
FIG. 8 is a cross section view of portions of a second embodiment of the present invention taken from FIG. 7 as indicated with certain features added for illustration.
Figure 9:
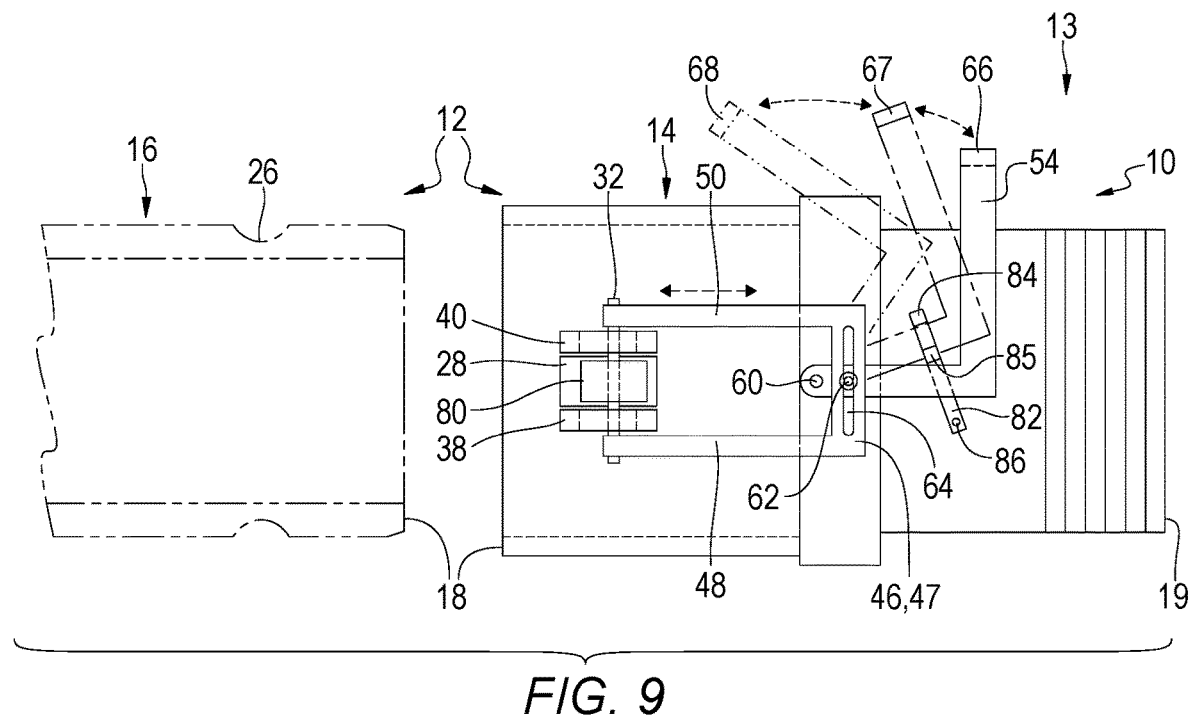
FIG. 9 is a side view of a second embodiment of the present invention.
Figure 11:
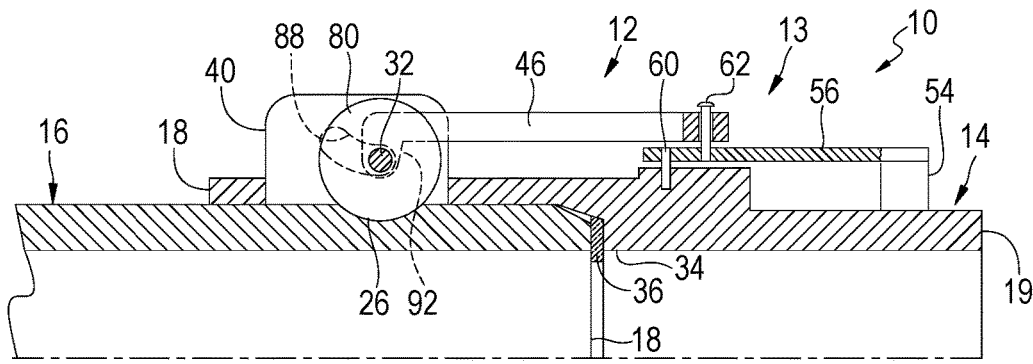
FIGS. 11 to 13 are cross sectional views of portions of a second embodiment of the present invention.
Figure 12:
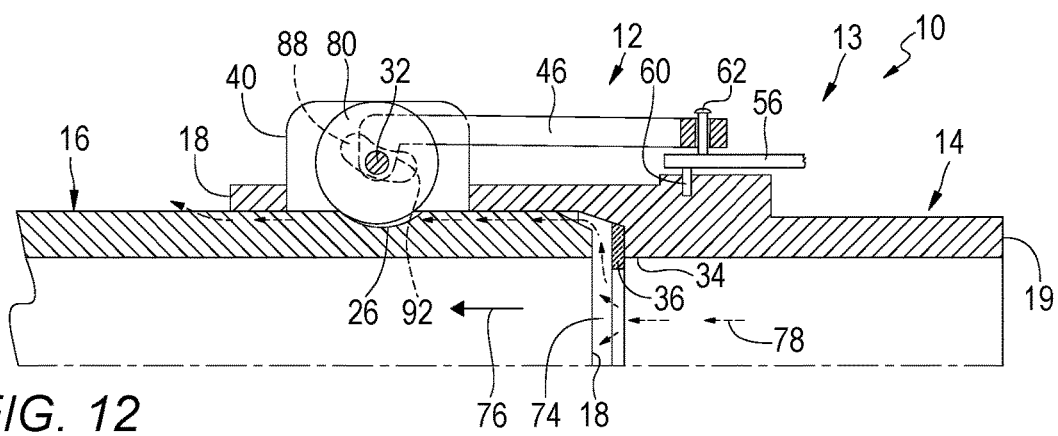
Figure 13:
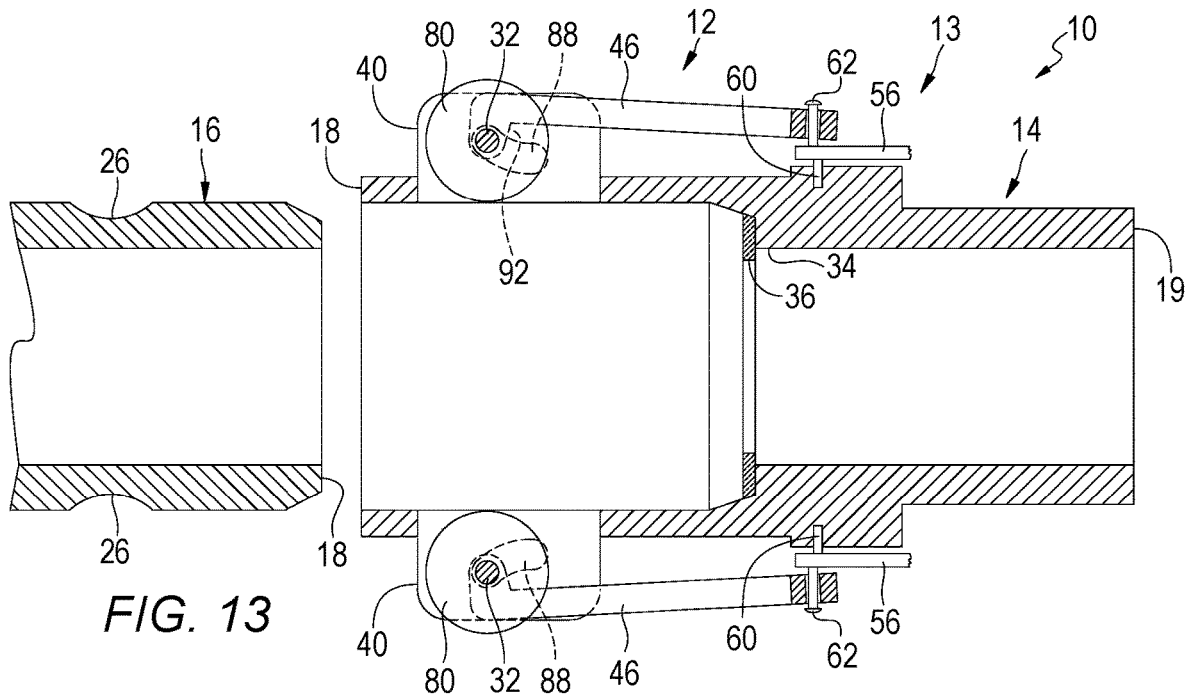

Turning to FIGS. 7, 8 and 9, therein is shown a second embodiment 13 of the present invention 10 a cam lock fitting 12 having a female conduit end coupling portion 14 and a male conduit end coupling portion 16 each having an end 18 which when joined together form a conduit. The female portion 14 has a pair of cam disks 80 which cam disks lock the female end 14 to the male end 16 by seating the cam disk 80 of the female portion within a groove 26 of the male portion as the two portions are joined. The cam disk 80 projects through an opening 28 in the wall 30 near the end 18 of the female portion 14 as the cam disk 80 moves on axle 32 which slides in arcuate slots 88. Slots 88 (as best seen in FIGS. 11 to 13) are shaped, sized and sloped so that cam disk 80 fits in and engages groove 26 when axle 32 is disposed in the rear end of slot 88 (i.e., oriented toward end 19 of female conduit 14) and cam disk 80 is disengaged from groove 26 when axle 32 is disposed in the front end of slot 88 (i.e., oriented toward the front end 18 of female conduit 14). Also disposed on the inside of the female portion 14 is an annular flange 34 (not shown, see FIGS. 11-13) cooperating with an O-ring seal or gasket 36 therein, wherein the flange and O-ring extend entirely around the internal periphery of the female portion for making sealing contact with the end 18 of the male end portion 16 in a conventional manner when the male and female conduits 16, 14 are connected to each other. The cam disks 80 are each mounted onto an axle 32 extending through a left and right boss 38, 40, having opening 28 therebetween, on opposite sides of female coupling 14.

Also shown is a U-shaped bracket 46 having a base portion 47 and a pair of oppositely disposed arm portions 48, 50 wherein each arm portion is connected to an end of the axle 32 which axle passes through bosses 38, 40. Also shown is a safety lock assembly generally indicated at 52 having a U-shaped safety lock handle portion 54 and a safety lock arm portion 56, 58 disposed on opposite sides of the female coupling 14 (arm 58 is shown in FIG. 13) wherein each arm portion is mounted on a pivot 60 mounted onto an external surface of the wall 30 of the female portion 14 so that the handle portion 54 can be moved or partially rotated from a first position to a second position as shown in FIG. 9. Each arm portion 56, 58 has a pin/roller 62 mounted thereon which cooperates with a slot 64 in the base 47 of bracket 46 so that when the handle portion 54 is in a first downward closed position 66 the bracket 46 is moved to a first rear position away from end 18 and when the handle portion 54 is moved to a second upward open position 68 the bracket 46 moves to a second forward position toward end 18. Also shown is an optional resilient spring-steel safety latch 82 having an enlarged head or catch 84 thereon, the catch being offset from the longitudinal centerline of latch 82, the latch 82 being mounted onto the outside wall 30 of the female conduit using a rivet 86 or the like. The purpose of the safety latch 82 is to prevent arm 56 from being inadvertently opened because latch 82, to be released, must be pressed or pushed inwardly toward the centerline of the female conduit 14 to allow arm 56 to freely pass by head/catch 84 as the arm travels from an intermediate position to an open position. An optional head/catch 85 is also shown which may be provided as an additional safety latch to maintain arm 54 in the downward closed position 66. If head/catch 85 is present then it, similarly to head/catch 84, must be released in order for arm 54 to be moved.

In order for an operator to open a cam lock fitting 12 designed according to the teachings of embodiment 13 of the present invention 10, the operator must first move the safety handle 54 from the first downward closed position 66 to an intermediate position or partially open position 67 (as best seen in FIG. 9) so that the cam disks 80 are moved from a rearward position away from front end 18 to a more forward position toward front end 18 so as to relieve internal pressure contained inside the cam lock fitting so that when there is no pressure remaining in the cam lock fitting 12 the operator can continue with the next step of opening the cam lock fitting by pressing the head/catch 84 inwardly to allow handle 54 to be moved to the open position 68 for completely separating the male 16 and female 14 conduit portions. If there is still pressure inside the cam lock fitting 12 when the safety lock handle 54 is opened, the operator will immediately reclose the safety lock handle 54 so as to pull the cam disk 80 back into the locked position so as to reclose and reseal the cam lock fitting.

Turning to FIG. 9, therein is shown the present invention 10 showing the handle portion 54 of the safety lock assembly 52 in a first downward closed position shown at 66 and then in a second upward open position shown at 68 in order to illustrate the movement of the handle portion 54 of the safety lock assembly 52. Handle portion 54 also has an intermediate position 67 which is accomplished in cooperation with safety latch 82. The cam disks 80 are adapted to slide or move in response to movement of the handle portion 54 by having a bracket 46 connected to the axles 32 passing through the bosses 38, 40 and the cam disk 80 so that the cam disks 80 slide toward and away from end 18 in response to movement of the handle portion 54. Previously disclosed elements may also be shown.

Figure 10:
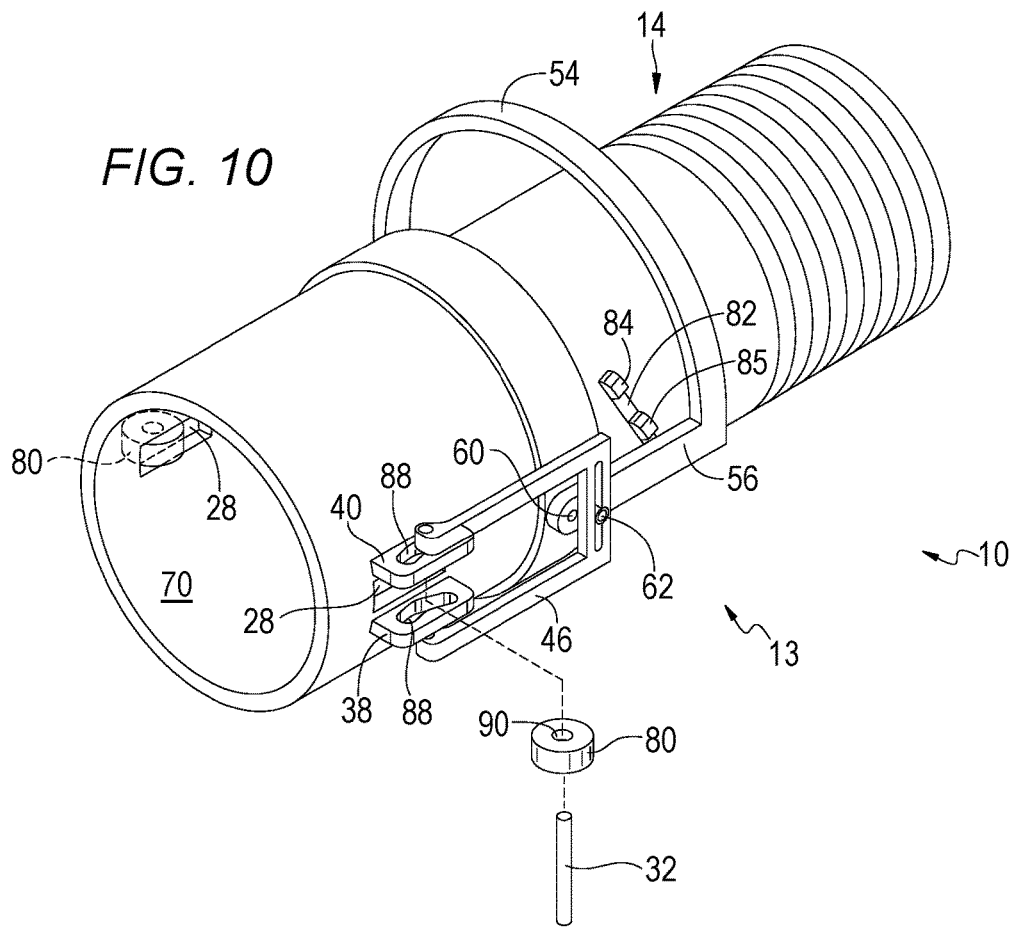
FIG. 10 is a perspective view showing the inside of a female coupling of a second embodiment of the present invention with certain parts being exploded away for illustration.

Turning to FIG. 10, therein is shown the inside 70 of the female coupling 14 along with the cam disks 80 on opposing sides of the female end portion 14 showing the bosses 38, 40 on the side of the female coupling and having a first opening or slot 28 thereinbetween through which the cam disks 80 pass through the wall 30 of the female end portion 14. Also shown are slots 88 in the bosses 38, 40 on each side of the opening 28. As previously stated, the axle 32 is connected to a bracket 46 so that the axles 32 slide in slot 88 in response to movement of the handle 54. Cam disk 80 has a central aperture 90 therein for receiving axle 32. Previously disclosed elements may also be shown.

Turning to FIGS. 11 to 13, therein is shown the steps of operation of the second embodiment 13 of the present invention 10 showing movement of the male conduit portion 16 relative to the female conduit 14 in response to movement of the safety handle 54 as previously disclosed. Bracket arm 50 may have an inwardly oriented offset portion 92 thereon to allow cam disk 80 to more easily engage groove 26. It can be seen that arcuate slot 88 has a first end (oriented toward rear end 19 of the female conduit 14) which is closer to the centerline of female conduit 14 and a second end (oriented toward the front end 18 of the female conduit 14) which is farther away laterally from the centerline of female conduit 14 so that as the axle 32 moves from the first end toward the second end the axle not only moves longitudinally along the female conduit 14 but in a lateral direction away from the centerline of the female conduit 14 which moves cam disk 80 relative to groove 26. FIG. 11 shows the male conduit portion 16 mated tightly to the female conduit portion 14 as would be the condition when the cam lock fitting 12 is in a connected sealing position and the safety handle 54 is in a first downward closed position so that the end 18 of the male end portion 16 is tightly sealed against the O-ring 36 of the female end portion 14 with cam disk 80 in a closed position. It can be seen in FIG. 11 that the axle 32 with cam disk 80 thereon is positioned in the slot 88 so as to be disposed away from end 18 and toward the rearward end 19 of the female end portion 14 of the cam lock fitting 12 so that cam disk 80 fully engages and effectively fills groove 26 of the male conduit 16.

In contrast, FIG. 12 shows the male end portion 16 with a space 74 in between its end 18 and the O-ring 36 which would occur when the handle 54 is in an intermediate position 67 (as best seen in FIG. 9) which would allow the axle 32 to slide to an intermediate position toward the front end 18 of female conduit 14 so as to allow cam disk 80 to partially or loosely engage groove 26 thereby allowing the release of pressure or material 78 from the inside of the female conduit portion 14 of the cam lock fitting 12 as indicated by arrows 78. Movement of the male portion 16 is indicated by arrow 76. FIG. 13 illustrates axle 32 positioned at the forward or second end of slot 88 near the front end of female conduit 14 as would occur when handle 54 is in the upward position 68 (as best shown in FIG. 9) allowing the male 16 and female 14 conduits to completely separate. At this position cam disk 80 is in an open position withdrawn from groove 26 to allow the male and female conduits 16, 14 to be disconnected. Previously disclosed elements may also be shown.

By way of additional general explanation, and by making reference to FIGS. 7-13, embodiment 13 of the present invention 10 discloses a safety lock mechanism 52 mounted on an outside surface of female coupling 14 wherein the safety lock mechanism has a handle 54 which moves a bracket 46 connected to axle 32 and cam disk 80 so that when fluid in the cam lock fitting 12 is pressurized the handle remains in a first downward position 66 so as to seal and lock the cam lock fitting 12. In order to open the cam lock fitting 12, an operator must first move the handle 54 from the downward closed position 66 to intermediate position 67 so as to allow the end 18 of male coupling 16 to move slightly away from the O-ring 36 of female coupling 14 thereby creating a small space 74 to allow the operator to determine by visual or auditory observation, e.g., hissing, whether the cam lock fitting is pressurized or unpressurized. If the cam lock fitting 12 remains pressurized, the operator can quickly and easily reclose the cam lock fitting 12 by reclosing the safety handle 54, If the cam lock fitting 12 is unpressurized, the operator can then proceed to open the cam lock fitting by moving handle 54 to the open upward position 68 and separating the male 16 and female 14 conduits in the conventional manner. It should be clear that the present invention 10 teaches that an additional step is required to open or close a cam lock fitting constructed according to the teachings of the present invention 10, and, the additional step involves opening or closing safety handle 54 as taught therein.

Direction arrows shown in FIGS. 1-13 may be used throughout this specification to show direction of fluid flow, movement, or other activity/action described herein.

We claim:

1. An apparatus for a safety lock for an earless cam lock fitting, comprising:
    a) a male and a female conduit, said male and female conduits adapted for being connected to each other, said male conduit having an end thereon and an external peripheral groove adjacent said end, said female conduit having an end thereon and an internal seal disposed therein adjacent said end, wherein said end of said male conduit contacts said seal of said female conduit thereby preventing leakage when said male and female conduits are connected to each other;
    b) a first and a second cam disk being pivotally disposed on opposite sides of said female conduit, wherein each said cam disk is adapted to pivot through an opening in a wall of said female conduit and into said external peripheral groove so as to removably join said male conduit to said female conduit, wherein each said cam disk has a closed position when said male and female conduits are connected to each other and an open position when said male and female conduits are disconnected from each other;
    c) a first and second pair of bosses, each said pair having first and second bosses, each said pair of bosses disposed on opposite sides of said outer surface of said female conduit, said first and second bosses being disposed on opposite sides of and adjacent each said opening in said wall of said female conduit, an axle extending through each said pair of bosses, said cam disk adapted for being mounted on said axle so as to rotate through said opening in said wall of said female conduit;
    d) each said boss having an arcuate slot therein, wherein an end of each said axle is slidably disposed in a corresponding said arcuate slot so that said axles slide in said arcuate slots as said axles move between rearward and forward positions;
    e) a safety handle disposed on said outer surface of said female conduit, said safety handle adapted for movement between a downward position, an intermediate position, and an upward position, said safety handle being adapted for connection to each said axle; and
    f) wherein when said safety handle is in said downward position each said axle is in said rearward position in which said male and female conduits are sealed thereby preventing leakage between said male and female conduits, wherein when said safety handle is in said intermediate position each said axle is in an intermediate position in which said male and female conduits are slightly separated from each other thereby allowing leakage between said male and female conduits, wherein if said leakage is observed by an operator said safety handle is moved back to said downward position to permit the male and female conduits to be reconnected to each other, wherein if no leakage is observed by the operator said safety handle is moved to said upward position so that each said axle is in said forward position to allow said male and female conduits to be disconnected from each other.

2. The apparatus of claim 1, further comprising:
    a) a bracket corresponding to each said axle, each said bracket having a pair of distal end portions, each said distal end portion connected to a corresponding end of each said axle so as to cooperate with said axles as said axles move between said rearward and forward positions; and,
    b) each said bracket adapted to move between said rearward and forward positions in response to movement of said safety handle between said downward and upward positions.

3. The apparatus of claim 2, further comprising an arm portion disposed on said safety handle, said arm portion adapted for connecting each said bracket to said safety handle so that each said bracket moves between said rearward and forward positions in response to movement of said safety handle between said downward and upward positions.

4. The apparatus of claim 2, further comprising each said bracket having a slot therein, each said slot for receiving a corresponding pin disposed on said safety handle, wherein each said slot and said pin cooperate to move each said bracket between said rearward and forward positions in response to movement of said safety handle between said downward and upward positions.

5. The apparatus of claim 3, further comprising a latch which cooperates with said arm portion to prevent said safety handle from being moved from an intermediate position to said upward position without first releasing said latch.

6. The apparatus of claim 1, wherein said safety handle has a U-shaped handle portion which fits partially around said female conduit.

7. A method for a safety lock for an earless cam lock fitting, comprising the steps of:
    a) providing a male and a female conduit adapted for being connected to each other, the male conduit having an end thereon and an external peripheral groove adjacent the end, the female conduit having an end thereon and an internal seal disposed therein adjacent the end, wherein the end of the male conduit contacts the seal of the female conduit thereby preventing leakage when the male and female conduits are connected to each other;
    b) providing a first and a second cam disk being pivotally disposed on opposite sides of the female conduit, wherein each cam disk is adapted to pivot through an opening in a wall of the female conduit and into the external peripheral groove so as to removably join the male conduit to the female conduit, wherein each cam disk has a closed position when the male and female conduits are connected to each other and an open position when the male and female conduits are disconnected from each other;
    c) providing a first and second pair of bosses, each said pair having first and second bosses, each pair of bosses disposed on opposite sides of the outer surface of the female conduit, the first and second bosses being disposed on opposite sides of and adjacent each opening in the wall of the female conduit, an axle extending through each pair of bosses, the cam disk adapted for being mounted on the axle so as to rotate through the opening in the wall of the female conduit;

d) wherein each boss has an arcuate slot therein, wherein an end of each axle is slidably disposed in a corresponding arcuate slot so that the axles slide in the arcuate slots as the axles move between rearward and forward positions;

e) providing a safety handle on the outer surface of the female conduit, the safety handle adapted for movement between a downward position, an intermediate position, and an upward position, the safety handle being adapted for connection to each axle; and f) wherein when the safety handle is in the downward position each axle is in the rearward position in which the male and female conduits are sealed thereby preventing leakage between the male and female conduits, wherein when the safety handle is in the intermediate position each axle is in an intermediate position in which the male and female conduits are slightly separated from each other thereby allowing leakage between the male and female conduits, wherein if leakage is observed by an operator the safety handle is moved back to the downward position to permit the male and female conduits to be reconnected to each other, wherein if no leaka e is observed by the operator the safety handle is moved to the upward position so that each axle is in the forward position to allow the male and female conduits to be disconnected from each other.

8. The method of claim 7, further comprising the steps of:

a) providing a bracket corresponding to each axle, each bracket having a pair of distal end portions, each distal end portion connected to a corresponding end of each axle so as to cooperate with the axles as the axles move between the rearward and forward positions; and, b) each bracket adapted to move between the rearward and forward positions in response to movement of the safety handle between the downward and upward positions.

9. The method of claim 8, further comprising the step of providing an arm portion on the safety handle, the arm portion adapted for connecting each bracket to the safety handle so that each bracket moves between the rearward and forward positions in response to movement of the safety handle between the downward and upward positions.

10. The method of claim 9, further comprising the step of providing a latch which cooperates with the arra portion to prevent the safety handle from being moved from an intermediate position to the upward position without first releasing the latch.

* * * * *